United States Patent
Murata et al.

(10) Patent No.: US 6,226,100 B1
(45) Date of Patent: May 1, 2001

(54) PRINTING APPARATUS AND PRINTING CONTROL METHOD

(75) Inventors: Takayuki Murata; Shinichi Omo; Masahiko Umezawa, all of Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/016,424

(22) Filed: Jan. 30, 1998

(30) Foreign Application Priority Data

Jan. 31, 1997 (JP) .................................................... 9-019376

(51) Int. Cl.⁷ ................................................ G06K 15/00
(52) U.S. Cl. ............................................ 358/1.8; 358/1.18
(58) Field of Search ................................... 395/105, 108, 395/111, 115, 102; 347/5, 40, 1; 400/279, 323; 358/530, 537, 443, 452, 444, 448; 382/293, 295–299; 345/126, 437; 710/22

(56) References Cited

U.S. PATENT DOCUMENTS

| | | | |
|---|---|---|---|
| 3,849,592 | 11/1974 | Rosenheck | 178/6 |
| 4,095,248 | 6/1978 | Kolker et al. | 358/288 |
| 4,240,118 | 12/1980 | Wellendorf et al. | 358/296 |
| 4,313,124 | 1/1982 | Hara | 346/140 R |
| 4,345,262 | 8/1982 | Shirato et al. | 346/140 R |
| 4,376,588 * | 3/1983 | Moeller | 400/322 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,691,364 * | 9/1987 | Fukuzawa et al. | 382/299 |
| 4,723,129 | 2/1988 | Endo et al. | 346/1.1 |
| 4,740,796 | 4/1988 | Endo et al. | 346/1.1 |
| 4,761,085 * | 8/1988 | Angst et al. | 400/323 |
| 5,012,434 * | 4/1991 | Zietlow et al. | 395/117 |
| 5,018,884 | 5/1991 | Hirano et al. | 400/126 |
| 5,166,708 | 11/1992 | Hirano et al. | 346/140 R |
| 5,299,873 * | 4/1994 | Miebori | 400/279 |

(List continued on next page.)

FOREIGN PATENT DOCUMENTS

| | | |
|---|---|---|
| 0 082 628 | 6/1983 | (EP) . |
| 0 264 265 | 4/1988 | (EP) . |
| 0 300 743 | 1/1989 | (EP) . |
| 0 613 288 | 8/1994 | (EP) . |
| 0 730 249 | 9/1996 | (EP) . |
| 0 772 344 | 5/1997 | (EP) . |
| 54-56847 | 5/1979 | (JP) . |
| 59-123670 | 7/1984 | (JP) . |
| 59-138461 | 8/1984 | (JP) . |
| 60-71260 | 4/1985 | (JP) . |
| 2-78587 | 3/1990 | (JP) . |
| 6-64208 | 3/1994 | (JP) . |
| 8-197785 | 8/1996 | (JP) . |
| 8-282053 | 10/1996 | (JP) . |

Primary Examiner—Arthur G. Evans
(74) Attorney, Agent, or Firm—Fitzpatrick, Cella, Harper & Scinto (57) ABSTRACT

A printing apparatus and a print control method for performing H-V conversion and minimum track printing at high speed. When printing is to be performed on a print medium by reciprocally scanning a printhead, image data is externally inputted, vertical and horizontal orientation of the inputted image data is converted with considering the print width of the printhead so that the vertical and horizontal arrays are reversed in a buffer of a DMAC, the outputted result is continuously processed by utilizing a logical circuit, the left and right ends where actual printing operation is performed based on the image data is detected within a scan area of the printhead, and the scan area of the printhead is controlled based on the detection result.

17 Claims, 9 Drawing Sheets

U.S. PATENT DOCUMENTS

| | | | |
|---|---|---|---|
| 5,315,691 | * 5/1994 | Sumiya et al. | 395/109 |
| 5,349,377 | 9/1994 | Gilliland et al. . | |
| 5,467,437 | * 11/1995 | Fuse | 395/115 |
| 5,511,890 | * 4/1996 | Momose | 400/323 |
| 5,527,121 | * 6/1996 | Santon | 400/323 |
| 5,579,453 | * 11/1996 | Lindenfelser et al. | 395/115 |
| 5,617,122 | 4/1997 | Numata et al. | 347/14 |
| 5,657,431 | * 8/1997 | Plakosh et al. | 395/115 |
| 5,669,721 | * 9/1997 | Santon et al. | 400/279 |
| 5,793,939 | * 8/1998 | Sagayama | 395/115 |
| 5,832,184 | * 11/1998 | Konno et al. | 395/102 |
| 5,870,536 | * 2/1999 | Kurosawa | 395/67 |

* cited by examiner

WHEN IMAGE DATA IS RECEIVED FROM HOST

FIG. 4B

AT THE TIME OF PRINTING

PRINTING APPARATUS AND PRINTING CONTROL METHOD

BACKGROUND OF THE INVENTION

The present invention relates to a data conversion apparatus, a data conversion method, a printing apparatus using the data conversion apparatus and print control method and, more particularly, to a data conversion apparatus for converting vertical and horizontal orientation of inputted data, a printing apparatus and print control method for performing printing by converting vertical and horizontal orientation of inputted image data.

A serial-scan-type printing apparatus forms an image on a print medium e.g., a print sheet, by scanning a printhead, having plural printing elements arranged in a direction parallel to a conveyance direction of the print medium, in a direction perpendicular to the conveyance direction of the print medium.

Image data, transferred by a host computer (hereinafter referred to as a host) connected to the printing apparatus, consists of pixels arrayed in line in the scanning direction of a printhead. The data having such arrays of pixels is called raster data. In order to transfer image data having such arrays to a printhead, the printing apparatus needs to convert the orientation (arrays) of pixels so as to be adapted to an array of printing elements of the printhead.

Conventionally, such raster-column conversion (hereinafter referred to as H-V conversion) is executed by a processing program which reads plural lines of image data out of a buffer memory and writes converted data back to the buffer while shifting the read data.

However, it has become a trend to perform the H-V conversion by DMA (direct memory access) processing along with demands for high-speed data processing performed by a high-speed printing apparatus. Moreover, to increase the print operation speed, a minimum track printing method has been suggested. According to the minimum track printing method, the current position and the next print occurrence position of a carriage incorporating a printhead are detected and the carriage is moved in the most efficient manner to reduce wasteful operation time.

However, in order to perform the minimum track printing, a buffer storing image data must be scanned to detect positions where printing operations occur and positions where printing operations do not occur within a carriage movable range. Conventionally, such detection required considerable time, interfering with the primary object, i.e. the high-speed printing operation.

SUMMARY OF THE INVENTION

The present invention has been made in consideration of the above situation, and has as its object to provide a printing apparatus and print control method capable of performing H-V conversion at high speed and performing minimum track printing at high speed.

According to the present invention, the foregoing object is attained by providing a printing apparatus for performing printing on a print medium by reciprocally scanning a printhead, comprising: input means for externally inputting image data; converting means for converting vertical and horizontal orientation of the image data inputted by the input means by DMA processing while considering a print width of the printhead; detecting means for consecutively processing an output result of the DMA processing and detecting a left end and a right end, where actual print operation is to be generated by the image data, within a scan area of the printhead; and control means for controlling the scan area of the printhead based on a detection result detected by the detecting means.

Furthermore, it is preferable that the apparatus includes storage means for storing the image data inputted by the input means and image data converted by the converting means.

Herein, each pixel of the image data is arrayed in a scanning direction of the printhead, and the image data converted by the converting means is arrayed along an array of printing elements of the printhead.

Moreover, it is preferable that the converting means executes conversion in units of a pixel length corresponding to the print width of the printhead.

It is preferable that the control means controls the printhead such that the printhead scans only between the left end and the right end where actual print operation is generated by the image data.

In addition, it is preferable that the detecting means initializes a detection value detected by said detecting means such that an initialized value can be discriminated from a value which may actually be detected, each time the left end and right end are detected for image data corresponding to a single scan of the printhead. Furthermore, values of the left end and the right end detected by the detecting means may represent storage addresses of image data which generate print operation at the left end and the right end of the scan area by the printhead, among the image data, corresponding to a single scan of the printhead, converted by the converting means and stored in the storage means.

Still further, it is preferable that the apparatus includes count means for counting an amount of the image data which generates actual print operation by the printhead, based on the image data, corresponding to a single scan of the printhead, converted by the converting means.

Note that the printhead may be an ink-jet printhead which performs printing by discharging ink, or may be a printhead for discharging ink by utilizing heat energy, and includes heat energy transducers for generating heat energy to be applied to the ink.

According to another aspect of the present invention, the foregoing object is attained by providing a print control method of a printing apparatus for performing printing on a print medium by reciprocally scanning a printhead, comprising: an input step of externally inputting image data; a converting step of converting vertical and horizontal orientation of the image data inputted in the input step by DMA processing while considering a print width of the printhead; a detecting step of consecutively processing an output result of the DMA processing and detecting a left end and a right end, where actual print operation is to be generated by the image data, within a scan area of the printhead; and a control step of controlling the scan area of the printhead based on a detection result detected in the detecting step.

According to the present invention as described above, at the time of printing an image on a print medium by reciprocally scanning a printhead, image data is externally inputted; vertical and horizontal orientation (arrays) of the inputted image data is converted by DMA processing, with considering a print width of the printhead; the output result of the DMA processing is continuously processed; a left end and a right end of image data in which actual print operation occur are detected within the scan area of the printhead; and on the basis of the detection result, the scan area of the printhead is controlled.

The present invention is particularly advantageous since the minimum track printing can be performed at high speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENT

Preferred embodiment of the present invention will be described in detail in accordance with the accompanying drawings.

Figure 1:
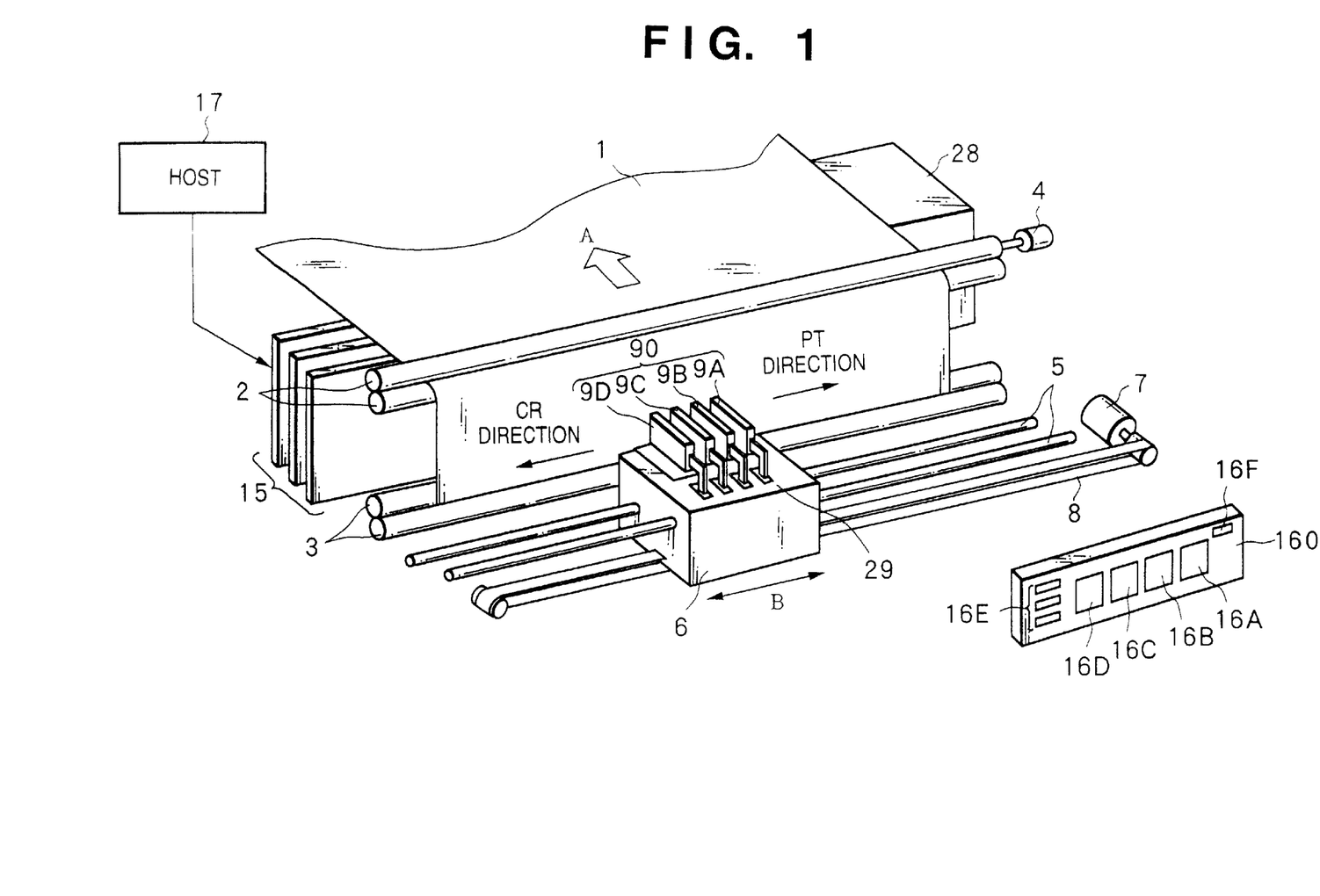
FIG. 1 is a perspective view of a color printing apparatus (printer), shown as a typical embodiment of the present invention, having a printhead which performs printing by an ink-jet printing method.

FIG. 1 is a perspective view of a color printer (hereinafter referred to as a printer), shown as a typical embodiment of the present invention, having a printhead which performs printing by an ink-jet printing method. The printhead includes electrothermal transducers for discharging ink droplets from orifices by adding heat to ink and generating film boiling.

Referring to FIG. 1, a print medium 1, e.g. a print sheet or plastic sheet or the like is supported by a pair of conveyance rollers 2 and 3 which are arranged on and under a print area where printing is performed by a printhead 90, and the print sheet is conveyed in the arrow A direction by the conveyance roller 2 driven by a conveyance motor 4. In front of the conveyance rollers 2 and 3, guide shafts 5 are provided in parallel with the conveyance rollers. Along the guide shafts 5, a carriage 6 is reciprocally moved in the arrow B direction by a carriage motor 7 using a wire 8. When the carriage 6 moves in the PT direction, printing is performed on the print medium, and when the carriage 6 moves in the CR direction, the print medium 1 is conveyed.

A printhead 90 is mounted on the carriage 6. The printhead 90, capable of printing a color image, comprises four head units respectively discharging cyan (C) ink, magenta (M) ink, yellow (Y) ink and black (Bk) ink, i.e. the yellow (Y) head 9A, magenta (M) head 9B, cyan (C) head 9C and black (K) head 9D, arrayed along the carriage scanning direction (main scanning direction). On the front surface of each of the four head units, that is, the surface facing the print surface of the print medium 1 which is spaced away by a predetermined distance (e.g., 0.8 mm), a plurality of ink discharge orifices (e.g. 16, 32, 64, 128 or the like) are provided in line in a direction diagonal or perpendicular to the scanning direction of the carriage 6.

Figure 2:
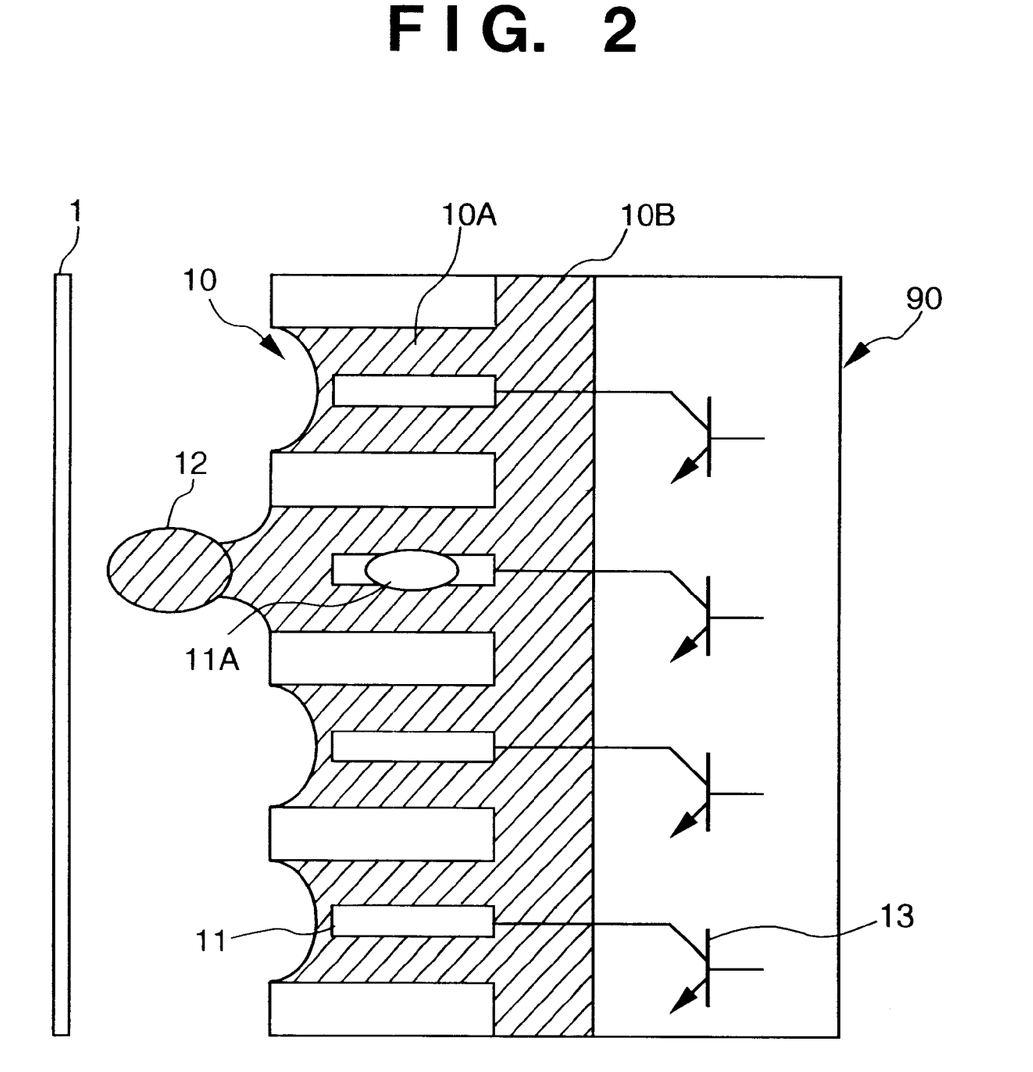
FIG. 2 is a schematic diagram showing a vertical cut-out view of a part of an ink-discharge portion which includes orifices of a printhead 90 shown in FIG. 1.

FIG. 2 is a schematic diagram showing a vertical cut-out view of a part of the ink-discharge portion which includes orifices of the printhead 90 (commonly referring the head units 9A to 9D).

Referring to FIG. 2, a plurality of orifices 10 are vertically formed at a predetermined pitch on the surface of the printhead facing the print medium 1. To execute print operation, electrothermal transducers 11 (e.g. heater) respectively corresponding to the orifices 10 are driven (energized and heated) based on print data, to cause a film boiling phenomenon in the ink stored in an ink liquid channel 10A, and consequently, a bubble 11A is formed. By the pressure generated at this time, ink is discharged from the orifices 10, and an ink droplet 12 is formed, then the ink droplet 12 is attached to the print medium 1 in a predetermined pattern. An image is printed by the dot pattern formed by the ink droplets attached to the print medium.

The printhead 90 includes a heat driver 13 for turning on/off the power supplied to the electrothermal transducers 11. The carriage 6 includes a circuit board that integrates a driving circuit (driver) for performing the above-described printing operation. Note that the reference numeral 10B in FIG. 2 is a common ink chamber.

Now, referring back to FIG. 1, an operation panel 160 mounted on an outer case (not shown) of the printer, has a key setting portion e.g. an ON/OFF switch key 16A, line feed key 16B, form feed key 16C, print mode change key 16D and the like, and a display portion including plural alarm lamps 16E, a power lamp 16F and the like configured by LEDs.

Note that in FIG. 1, reference numeral 15 denotes printer control circuits which will be described later; 17, a host computer (hereinafter referred to as a host) connected with a printer for controlling the printer and transferring image data to the printer; 28, a power supply circuit for supplying power to each unit of the printer; and 29, a printhead control circuit including the driving circuit of the printhead 90.

Figure 3:
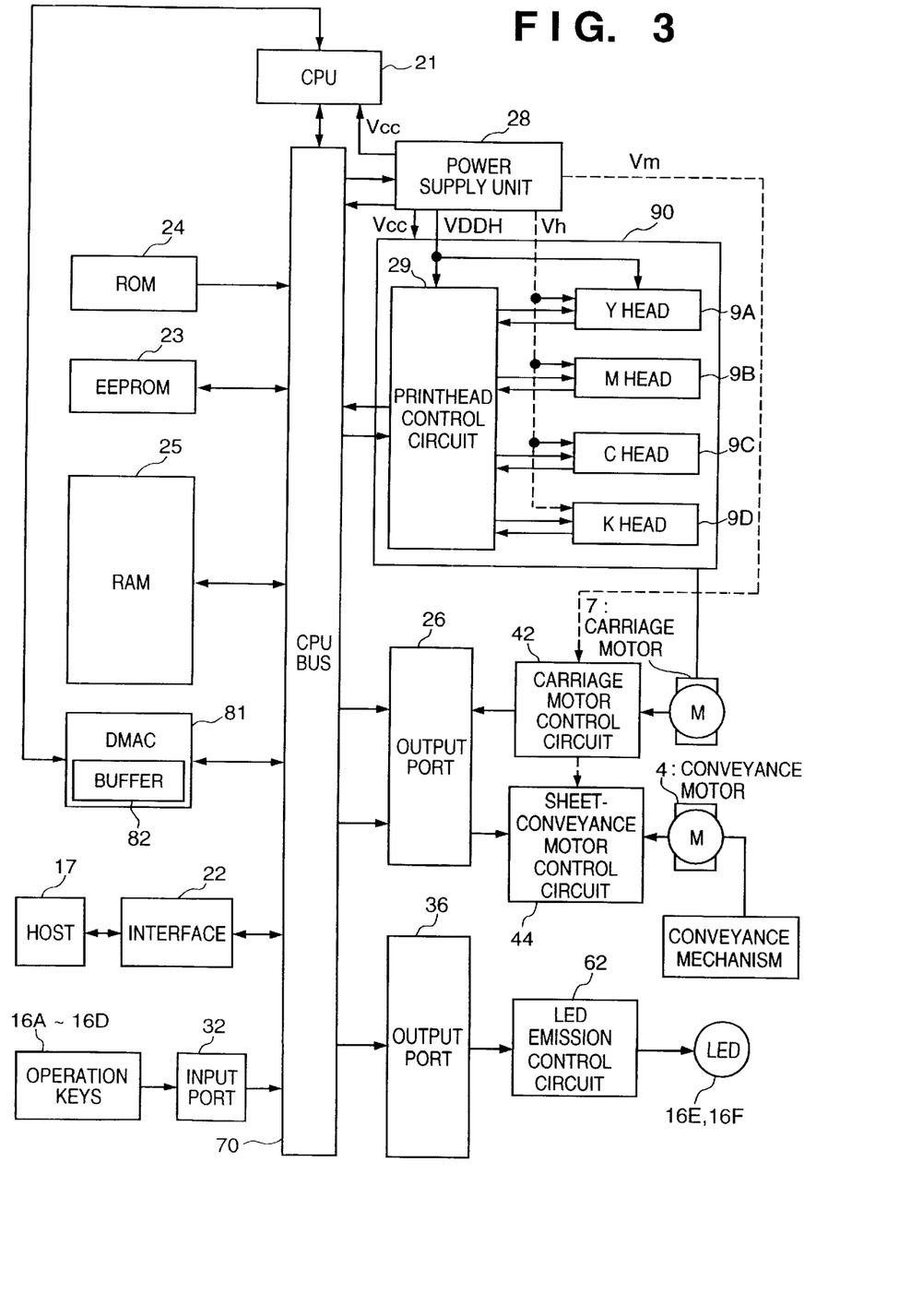
FIG. 3 is a block diagram showing an overall structure of a printer control circuit 15 shown in FIG. 1.

FIG. 3 is a block diagram showing an overall structure of the printer control circuit 15 shown in FIG. 1.

A CPU 21 in the form of a microprocessor is connected with the host 17 via an interface 22. The CPU 21 accesses a ROM 24 storing control programs, an EEPROM 23 storing updatable control programs, processing programs, various constant data and the like, and a RAM storing command signals (command) and print data signals transmitted by the host 17 via the interface 22, and controls printing operation based on the data stored in these memories. Moreover, the CPU 21 enables the carriage 6 to move by driving the carriage motor 7 via an output port 26 and carriage motor control circuit 42, and/or controls operation of conveyance mechanisms such as conveyance rollers 2 and 3 by driving the conveyance motor 4 via the output port 26 and a sheet-conveyance motor control circuit 44. Furthermore, the CPU 21 drives the printheads 9A to 9D via the printhead control circuit 29 based on print data stored in the RAM 25, enabling to print a desired image on the print sheet 1.

A power supply circuit 28 outputs a logic drive voltage Vcc (e.g. 5 V) for driving the CPU 21 and printhead control circuit 29, a drive voltage Vm (e.g. 30 V) for driving various motors, a heat voltage Vh for driving the printhead 90 (e.g. 25 V), a backup voltage VDDH for protecting the printhead 90 and the like. The heat voltage Vh is applied to the printhead 90; and the backup voltage VDDH is applied to the printhead control circuit 29 and printhead 90 respectively.

Moreover, a command inputted by the operation keys 16A to 16D is transmitted to the CPU 21 via an input port 32. When signals from the CPU 21 is transferred to an LED emission control circuit 62 via an output port 36, the LEDs 16E and 16F are lit.

Note that in FIG. 3, reference numeral 70 denotes a CPU bus interconnecting aforementioned various structural components; and 81, a DMA controller (DMAC) which performs high-speed data access control. The DMAC 81 includes a buffer 82 which is necessary to execute H-V conversion which will be described later.

The control circuit, including the CPU 21 and accompanying ROM 24, RAM 25 and the like receives command signals and data signals (print data) from the host 17, and based on the received data, a driving power source (heating power source) for energizing the electrothermal transducers is applied to each of the head units 9A to 9D via the printhead control circuit 29, along with a driving power source for various motors and the like.

Next, description will be provided on control method of the high-speed minimum track printing method using the printer having the above-described structure. Herein, one head unit of the printhead 90 will be described for the purpose of simplified description, and it is assumed that the head unit has 16 orifices. Assume that image data is binary data where each pixel is represented by one bit.

Figure 4A:
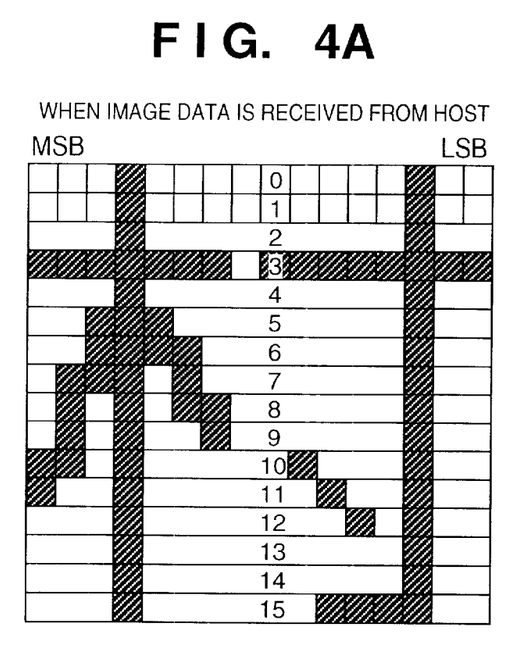
FIGS. 4A and 4B are explanatory views for describing raster-column conversion.
Figure 4B:
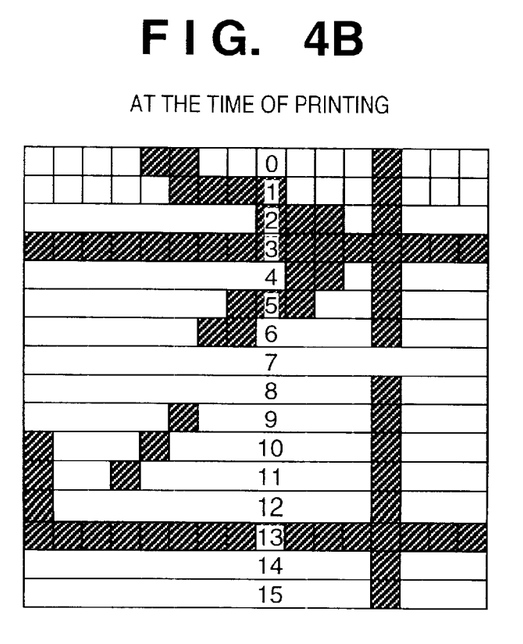

FIG. 4A is an explanatory view showing arrays of image data which represent a character pattern "村" transmitted by the host 17; and FIG. 4B, arrays of image data where H-V conversion is performed, which is used for printing. Note that in FIGS. 4A and 4B, the character pattern "村" is represented by a dot matrix having 16×16 dots, wherein one dot is represented by one-bit data. In other words, the dot matrix is configured by 16 numbers of data each having 16 bits in length.

FIG. 4A shows the image data arrayed in the PT direction; and FIG. 4B shows image data obtained by performing H-V conversion on the image data shown in FIG. 4A. The image data in FIG. 4B is arrayed in parallel with the array direction of the printing elements of the printhead 90. In FIGS. 4A and 4B, each area of the stripes represents data having a 16-bit length, and in FIG. 4A, the left side of the 16-bit length data is MSB (most significant bit) and the right side of the 16-bit length data is LSB (least significant bit).

By performing the above-described conversion, the image data, stored in the buffer memory provided in the RAM 25, is converted in terms of its data arrays (orientation) only, without losing original information transmitted by the host.

Figure 5:
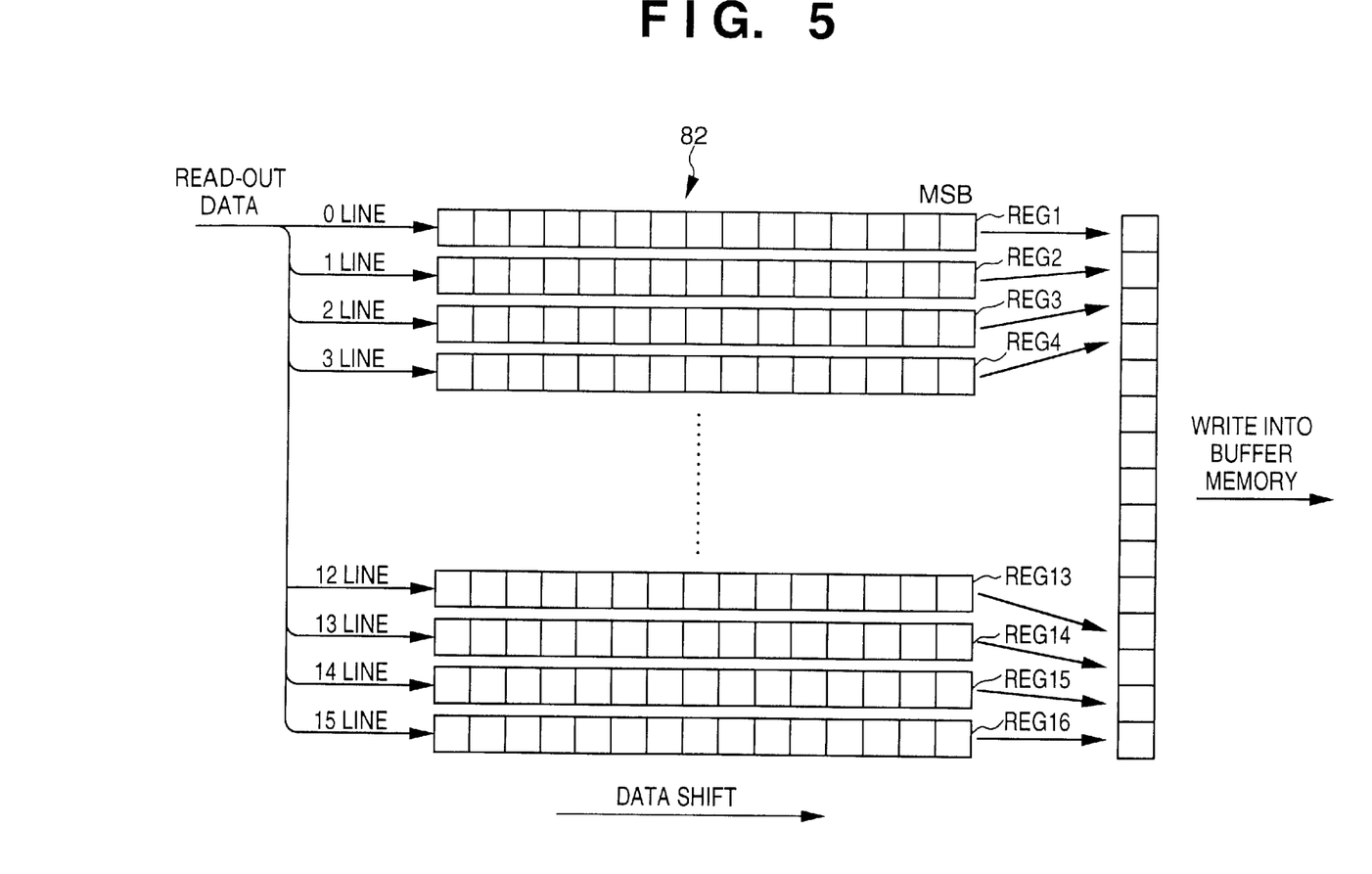
FIG. 5 is a schematic view showing how a DMAC 81 performs H-V conversion processing on image data shown in FIG. 4A.

FIG. 5 is a schematic view showing how the DMAC 81 performs H-V conversion processing on the image data shown in FIG. 4A.

As shown in FIG. 5, each line of data having a 16-bit length, stored in the buffer memory of the RAM 25, is read for 16 lines of data and stored in the buffer 82 of the DMAC 81. The buffer 82 is configured by 16 numbers of 16-bit shift registers (REG1, REG2, . . . , REG16), and the 16 bits of data of each line are set to different registers (REG1, REG2, . . . , REG16).

Herein, DMAC 81 extracts the MSB of each shift register (REG1, REG2, . . . , REG16) as 16-bit data, and writes the extracted data back to the buffer memory. Then, data in all the registers are shifted to the higher bit, and the MSB is similarly extracted and written in the data memory. By repeating this process, H-V conversion is performed on 16 bits×16 lines of image data.

In the present embodiment, the left and right ends of the scanning area in which the printhead performs print operation are detected at the time of performing H-V conversion.

Figure 6:
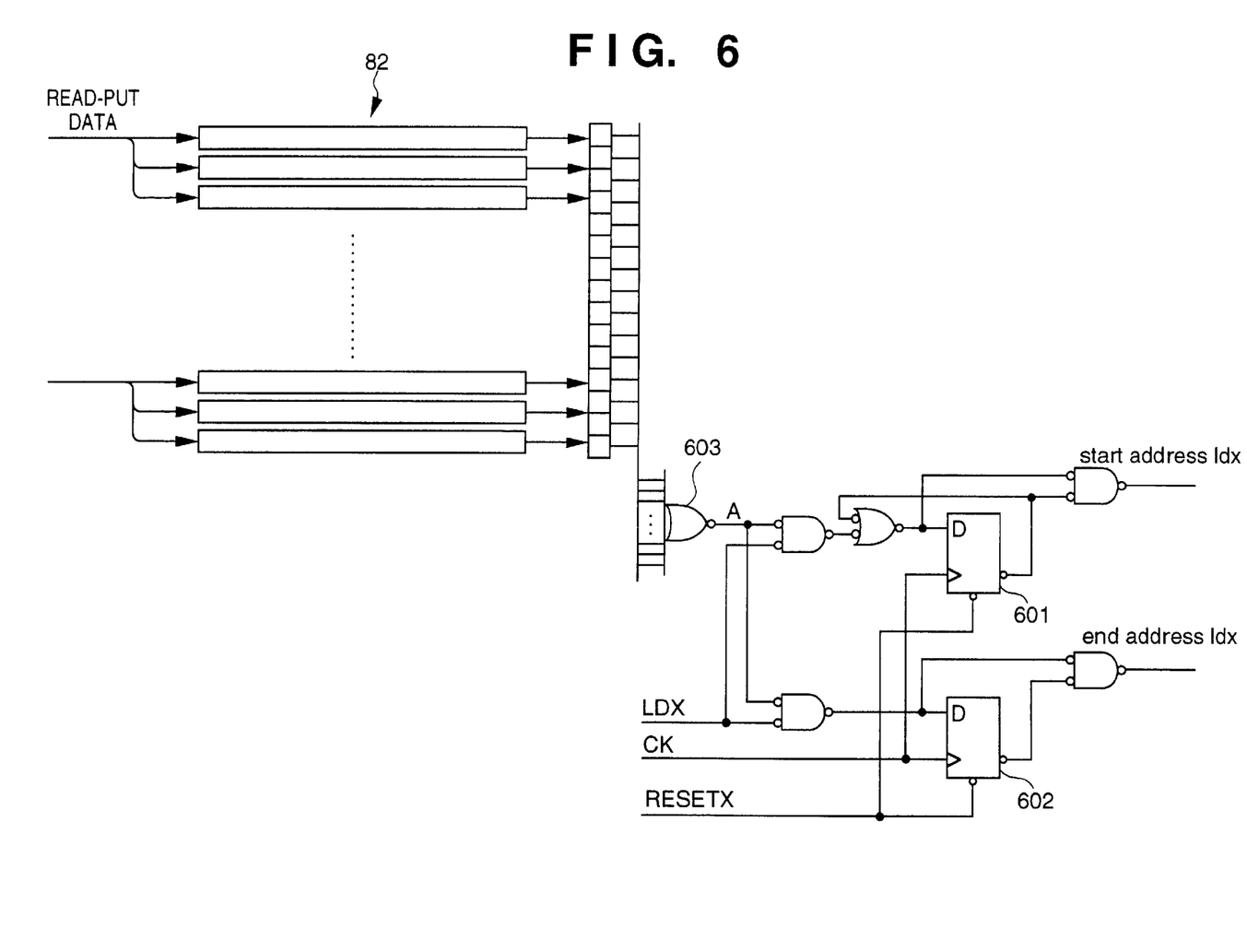
FIG. 6 is a circuit diagram of a detection circuit which detects the left and right ends of a scan area of a printhead based on image data on which H-V conversion has been performed.

FIG. 6 is a circuit diagram of a detection circuit which detects the left and right ends of the scanning positions of the printhead based on the H-V converted image data. The detection circuit may be integrated in the DMAC 81 or may be provided in between the DMAC 81 and CPU bus 70.

Referring to FIG. 6, RESETX indicates a reset signal for resetting values indicated by signals at each scanning of the printhead; CK, a synchronization clock signal for synchronizing an output signal; LDX, a timing signal for latching addresses which indicate the left and right ends; and A, a signal obtained by operating a logical OR of all bits of the H-V converted 16-bit length image data, for indicating whether or not the image data includes any print-effective bits that cause printhead to actually generate printing operation. The output signal "start address 1dx" is a load signal for latching an address value of a buffer memory storing the H-V converted 16-bit image data, in which a print-effective bit initially appears. The other output signal "end address 1dx" is a load signal for latching an address value of a buffer memory storing a print-effective bit.

In FIG. 6, reference numerals 601 and 602 denote a D-type flip-flop; and 603, an NOR circuit.

Next, operation of the detection circuit shown in FIG. 6 will be described with reference to FIG. 7 which shows a timing chart of control signals and 16 lines of H-V converted image data (i.e., image data corresponding to a single scan of a head unit).

First, data is transferred by the host 17 in units of 16 bits×16 lines, H-V conversion is performed on the image data stored in the buffer memory of the RAM 25 by the control of the DMAC 81, and the H-V converted data is written back to the buffer memory. During the conversion processing, if the 16-bit length image data includes a print-effective data, the signal A outputted by the NOR circuit 603 becomes "L". This signal is reshaped by the D-type flip flop 601 and 602, whereby obtaining the start address "1dx" and end address "1dx". Since the H-V conversion is controlled by the DMAC 80, an address is generated for writing the H-V converted image data into the buffer memory of the RAM 25 after the H-V conversion is performed. This address value is latched by the load signal "start address 1dx" and load signal "end address 1dx".

The load signal "end address 1dx" is generated each time a print-effective bit is detected, while the load signal "start address 1dx" is generated only when a print-effective bit is detected for the first time in a single scan of the printhead. Therefore, the load signal "start address 1dx" is able to latch an address of the buffer memory storing the left-end print-effective bit in the single scan of the printhead, and the load signal "end address 1dx" is able to latch an address of the buffer memory storing the last (right end) print-effective bit in the single scan of the printhead.

Figure 7:
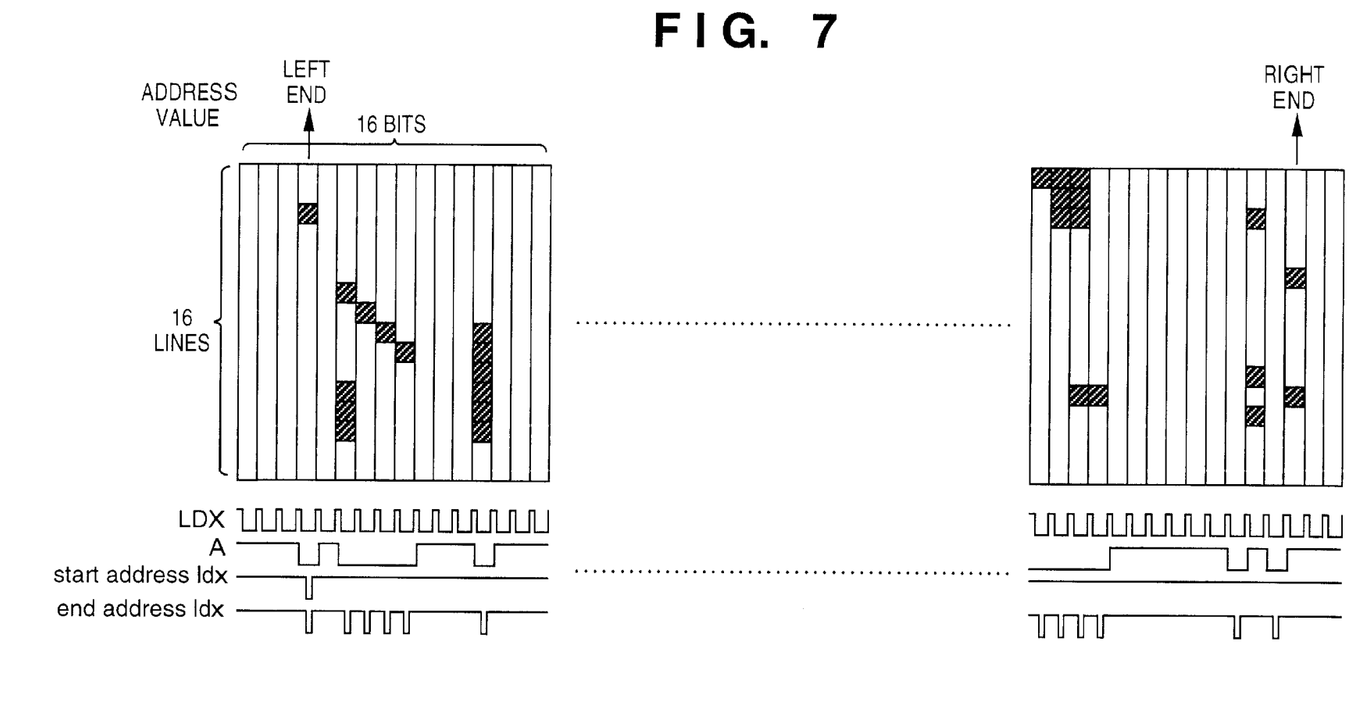
FIG. 7 is an explanatory view showing a timing chart of control signals and 16 lines of image data on which H-V conversion is performed.

In the example shown in FIG. 7, at the time of performing H-V conversion on image data which has been transferred by the host 17 in units of 16 bits×16 lines and stored in the buffer memory of the RAM 25, the left-end image data which causes the printhead to perform printing operation is stored in the address "LEFT END" of the buffer memory, and the right-end image data which causes the printhead to perform printing operation is stored in the address "RIGHT END" of the buffer memory.

In a case where a data area, corresponding to a single scan of the printhead, where H-V converted image data has been stored, includes only one print-effective data, the left-end address (LEFT END) and the right-end address (RIGHT END) have the same address. Moreover, in a case where a data area, corresponding to a single scan of the printhead, where H-V converted image data has been stored, does not include any print-effective data, a new address will not be set in the left-end address (LEFT END) and the right-end address (RIGHT END); thus, both addresses will have values initialized by the reset signal RESETX.

However, in a case where the image data storage address (RAM ADDRESS) of the buffer memory coincides with the address value initialized by the reset signal RESETX, e.g., in a case where the value of RAM ADDRESS is in the range of "00000000 (H: expressed by hexadecimal value)" to "00FFFFFF (H)", if a latch output is initialized to "00000000 (H)" by the reset signal RESETX, it is impossible to discriminate whether the storage area of the H-V converted image data has no print-effective data or the storage area includes print-effective data at the address "00000000 (H)".

To cope with such situation, in the present embodiment, a value larger than the latch output value, indicative of the right-end address (RIGHT END), is set to the latch output value indicative of the left-end address (LEFT END) at the time of initializing an address value by the reset signal RESETX. Accordingly, whether the storage area includes one print-effective data or the area has no print-effective data can be discriminated.

Figure 8:
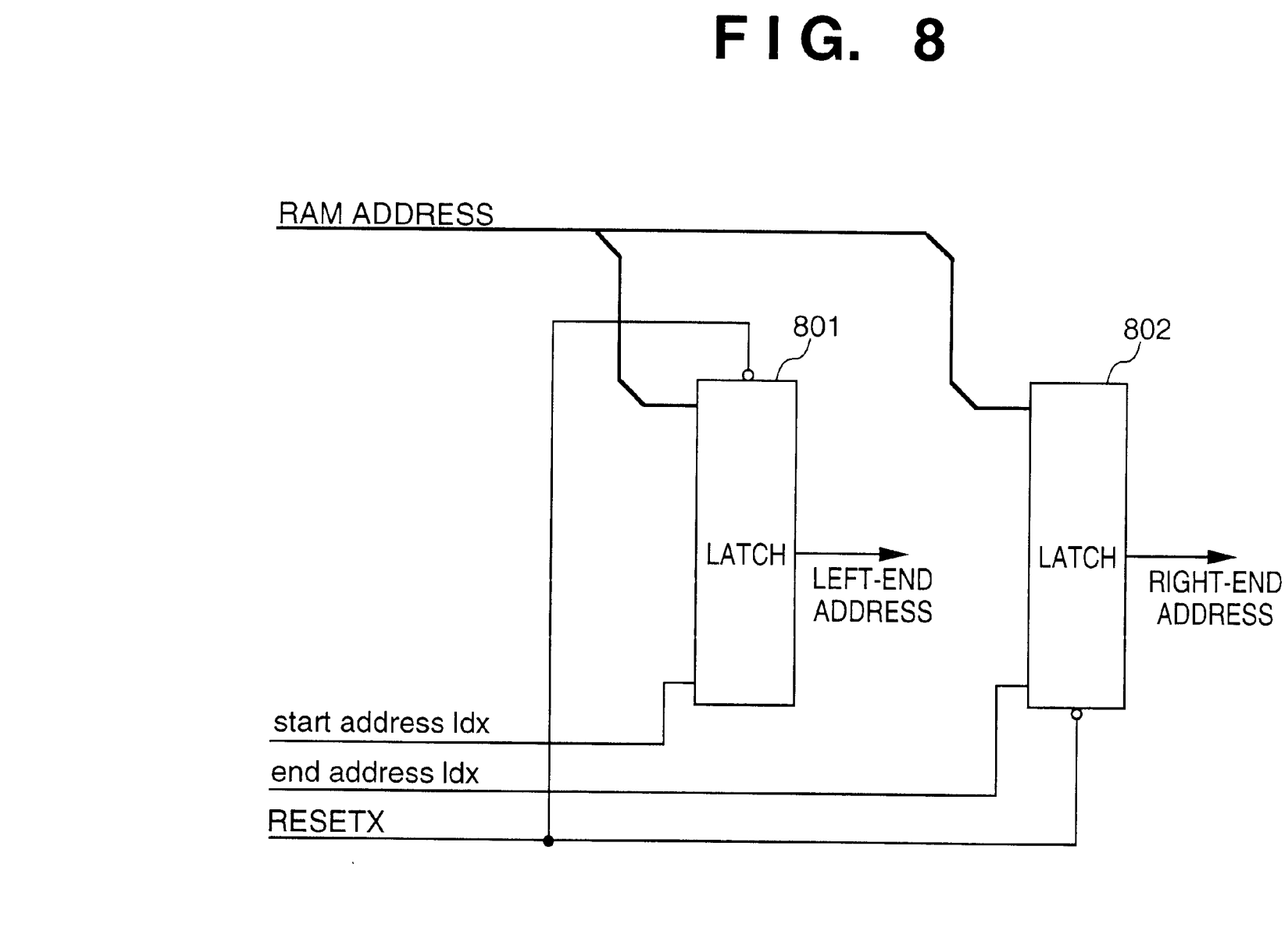
FIG. 8 is a block diagram showing the structure of a discrimination circuit.

FIG. 8 is a block diagram showing the structure of such discrimination circuit. The discrimination circuit may be integrated in the DMAC 81, or may be provided in between the DMAC 81 and CPU bus 70.

In the circuit shown in FIG. 8, it is assumed that an output value indicative of the left-end address (LEFT END) is "FFFFFFFF (H)" when the reset signal RESETX is inputted to the latch circuit 801, and an output value indicative of the right-end address (RIGHT END) is "00000000 (H)" when the reset signal RESETX is inputted to the latch circuit 802.

If print-effective data exists in the data buffer, the output value of the latch circuit is rewritten. Thus, the above-described condition (RIGHT END)≧(LEFT END) is satisfied.

Accordingly, upon performing H-V conversion, a value of the left-end address (LEFT END) is compared with a value of the right-end address (RIGHT END). If (RIGHT END)−(LEFT END)<0, it is discriminated that the data buffer includes no print-effective data.

Therefore, according to the above-described embodiment, after a single H-V conversion, i.e., upon completing H-V conversion on image data corresponding to a single scan of the printhead, it is possible to detect addresses of the buffer memory storing the left and right ends of the image data, in the printhead scanning area, which causes printing operation. By virtue of this, it is possible to realize quick carriage control.

Based on the detected result, it is possible to efficiently control carriage movement such that the carriage movement is minimized by limiting the scanning area of the printhead in actual printing operation. By virtue of this, it is possible to perform quick and efficient minimum track printing in addition to quick data processing by DMA.

Moreover, a circuit may be added to the above-described structure of the present embodiment for counting the number of print-effective data in the buffer memory while the DMAC 81 executes H-V conversion processing.

Figure 9:
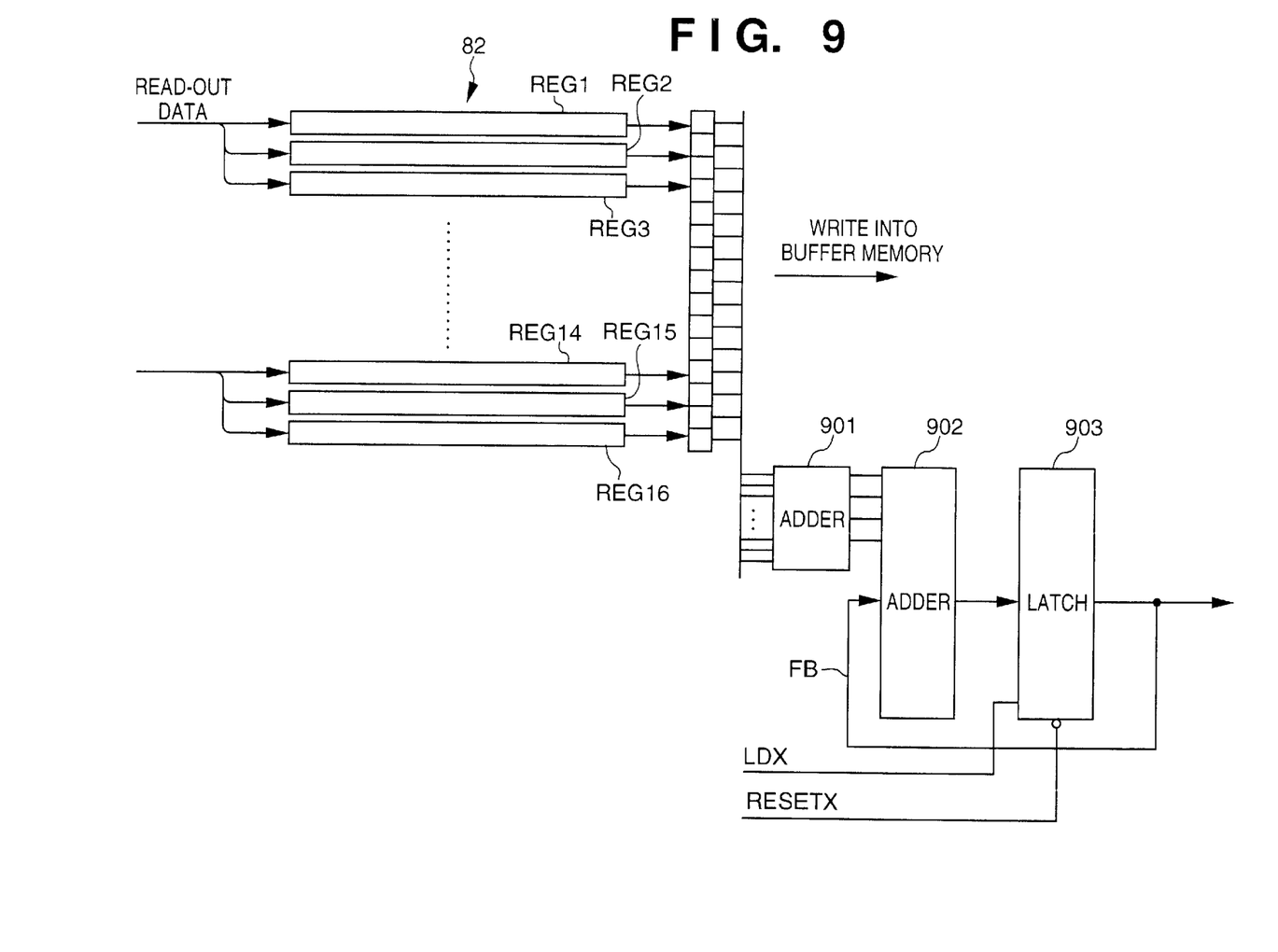
FIG. 9 is a block diagram showing a circuit structure of a counter which counts the number of pixels printed based on print-effective data.

FIG. 9 is a block diagram showing a circuit structure of a counter which counts the number of pixels printed based on the print-effective data.

As shown in FIG. 9, at the time of writing H-V converted image data into the buffer memory by DMA control of the DMAC 81, the number of print-effective data in the area corresponding to a single scan of the printhead 9 is obtained by summing up the data to be written in the buffer memory by utilizing adders 901 and 902.

In FIG. 9, an LDX signal is the same timing signal as the LDX signal shown in FIG. 6. According to the circuit structure of FIG. 9, 16-bit length data written in the buffer memory upon H-V conversion is summed up by the adder 901, and the result of calculation is added to the previous sum by the adder 902. More specifically, values in the registers (REG1 to REG16) are shifted, H-V conversion is performed with respect to 16 bits of the next column, and an output of a latch 903 is added to the output value of the adder 901 by inputting a feed back (FB) to the adder 902, upon input of the timing signal LDX.

By repeatedly performing the foregoing processing, it is possible to count the number of print-effective data included in the image data stored in the buffer memory while H-V conversion is performed.

By obtaining the number of data of the print-effective data, for instance, it is possible to evaluate an amount of ink consumption or power consumption necessary for print operation based on the obtained value. Thus, it is possible to estimate the lowering of ink residual by evaluating the amount of ink consumption. Therefore, in a case where the number of print-effective data is large, printing operation for the scanning area does not have to be completed by single scanning of the printhead, but for instance, printing may be controlled such to perform multi-scan printing by scanning the same area twice, so that it is possible to perform printing with low power consumption per single scan. Generally, the maximum number of printable dots in a printhead is preset. Thus, it is possible to predict the timing of replacement of a printhead based on this limitation.

The embodiment described above has exemplified a printer, which comprises means (e.g., an electrothermal transducer, laser beam generator, and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only single color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile). Furthermore, the invention is applicable also to a case where the invention is embodied by supplying a program to a system or apparatus.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for performing printing on a print medium by reciprocally scanning a printhead, comprising:

input means for inputting image data;

converting means for converting vertical and horizontal orientation of the image data inputted by said input means by DMA processing while taking into account a print width of the printhead;

detecting means for consecutively processing an output result of the DMA processing while converting the vertical and horizontal orientation of the image data by the DMA processing and detecting a left end and a right end, where an actual print operation is to be generated by the image data, within a scan area of the printhead; and control means for controlling the scan area of the printhead based on a detection result detected by said detecting means.

2. The apparatus according to claim 1, further comprising storage means for storing the image data inputted by said input means and image data converted by said converting means.

3. The apparatus according to claim 1, wherein each pixel of the image data inputted by said input means is arrayed in a scanning direction of the printhead, and the image data converted by said converting means is arrayed along an array of printing elements of the printhead.

4. The apparatus according to claim 1, wherein said converting means executes conversion in units of a pixel length corresponding to the print width of the printhead.

5. The apparatus according to claim 1, further comprising address storage means for storing addresses corresponding to the left end and the right end detected by said detecting means,
wherein said detecting means includes setting means for setting values of the addresses stored in said address storage means each time the left end and right end are detected for image data corresponding to a single scan of the printhead.

6. The apparatus according to claim 5, wherein said setting means sets the values of the addresses such that set values are discriminated from a value which may actually be detected.

7. The apparatus according to claim 2, wherein values of the left end and the right end detected by said detecting means represent storage addresses of image data which generate print operation at the left end and the right end of the scan area by the printhead, among the image data, corresponding to a single scan of the printhead, converted by said converting means and stored in said storage means.

8. The apparatus according to claim 1, further comprising count means for counting an amount of the image data which generates actual print operation by the printhead, based on the image data, corresponding to a single scan of the printhead, converted by said converting means.

9. The apparatus according to claim 1, wherein said printhead is an ink-jet printhead which performs printing by discharging ink.

10. The apparatus according to claim 9, wherein said printhead is a printhead for discharging ink by utilizing heat energy, and includes heat energy transducers for generating heat energy to be applied to the ink.

11. A print control method of a printing apparatus for performing printing on a print medium by reciprocally scanning a printhead, comprising:
an input step of inputting image data;
a converting step of converting vertical and horizontal orientation of the image data inputted in said input step by DMA processing while taking into account a print width of the printhead;
a detecting step of consecutively processing an output result of the DMA processing while converting the vertical and horizontal orientation of the image data by the DMA processing and detecting a left end and a right end, where an actual print operation is to be generated by the image data, within a scan area of the printhead; and
a control step of controlling the scan area of the printhead based on a detection result detected in said detecting step.

12. A printing apparatus for performing printing on a print medium by reciprocally scanning a printhead, comprising:
image data storage means for storing a plurality of raster data, each arranged in a predetermined direction;
extract means for sequentially extracting image data from each of the plurality of raster data stored in said image data storage means, and producing rearranged image data whose rearranged direction is different from the predetermined direction;
storage means for storing, on the basis of the rearranged image data produced by said extracting means, a print-start position and a print-end position where actual printing is performed by a single scan of the printhead; and
control means for performing printing by controlling a scan area of the printhead based on the print-start position and print-end position stored in said storage means.

13. A printing apparatus for performing printing on a print medium by reciprocally scanning a printhead, comprising:
image data storage means for storing a plurality of raster data, each arranged in a predetermined direction;
extract means for sequentially extracting image data from each of the plurality of raster data stored in said image data storage means, and producing rearranged image data whose rearranged direction is different from the predetermined direction;
count means for counting, on the basis of the rearranged image data produced by said extracting means, a number of print dots to be printed based on image data which generates actual printing operation by the printhead by a single scan of the printhead; and
control means for controlling the printing performed by the printhead based on the result counted by said count means.

14. A print control method for controlling print operation on a print medium by reciprocally scanning a printhead, comprising:
a first storing step of storing a plurality of raster data, each arranged in a predetermined direction in a buffer memory;
an extracting step of extracting image data from each of the plurality of raster data stored in the buffer memory and sequentially inputting the extracted image data to a plurality of shift registers;
a second storing step of sequentially extracting the image data from the most significant bit of each of the plurality of shift registers so as to produce rearranged image data whose rearranged direction is different from the predetermined direction and storing the rearranged image data back in the buffer memory;
an obtaining step of obtaining, on the basis of the rearranged image data stored in the buffer memory in said second storing step, data indicative of a print-start position and a print-end position, where actual printing is performed, and storing the obtained data in a storage medium, by a single scan of the printhead;
a controlling step of performing printing by controlling a scan area of the printhead based on the data indicative of the print-start position and print-end position stored in the storage medium.

15. A print control method for controlling print operation on a print medium by reciprocally scanning a printhead, comprising:
a first storing step of storing a plurality of raster data, each arranged in a predetermined direction in a buffer memory;
an extracting step of extracting image data from each of the plurality of raster data stored in the buffer memory and sequentially inputting the extracted image data to a plurality of shift registers;

a second storing step of sequentially extracting the image data from the most significant bit of each of the plurality of shift registers so as to produce rearranged image data whose rearranged direction is different from the predetermined direction and storing the rearranged image data back in the buffer memory;

a counting step of counting, on the basis of the rearranged image data stored in the buffer memory in said second storing step, a number of print dots to be printed based on image data which generates actual printing operation by the printhead by a single scan of the printhead; and a controlling step of controlling the printing performed by the printhead based on the result counted in said counting step.

16. A data conversion apparatus for converting orientation of data comprising:

input means for inputting a plurality of data arrays, each having a predetermined numbers of bits;

a plurality of first data holding means for respectively holding the predetermined number of bits of data inputted by said input means;

second data holding means for holding data, of which a number of bits correspond to the number of said plurality of first data holding means; and processing means for picking up a plurality of bits of data held by said second data holding means, and performing latch and/or add operations in accordance with each value of the plurality of bits of data, wherein the data held by said second data holding means is composed of bits, each bit obtained from each of said plurality of first data holding means, and said second data holding means is constructed such that the data is transferable to an external memory.

17. A data conversion method applied to an apparatus including a plurality of first data holding means for respectively holding a predetermined number of bits of data and second data holding means for holding data, of which a number of bits correspond to the number of the plurality of first data holding means, said method comprising the steps of:

inputting a plurality of data arrays, each having the predetermined numbers of bits, corresponding to each of the plurality of first data holding means;

picking up data bit by bit from each of the plurality of first data holding means;

holding the picked-up data in the second data holding means;

transferring the data held in the second data holding means to an external memory;

picking up the data held in the second data holding means; and performing latch and/or add operations in accordance with each bit value of the data which has been picked up from the second data holding means.

\* \* \* \* \*

UNITED STATES PATENT AND TRADEMARK OFFICE
CERTIFICATE OF CORRECTION

PATENT NO. : 6,226,100 B1
DATED : May 1, 2001
INVENTOR(S) : Takayuki Murata et al.

Page 1 of 1

It is certified that error appears in the above-identified patent and that said Letters Patent is hereby corrected as shown below:

<u>Column 12,</u>
Line 53, "printhead;" should read -- printhead; and --.

Signed and Sealed this

Twelfth Day of March, 2002

Attest:

Attesting Officer

JAMES E. ROGAN
Director of the United States Patent and Trademark Office